No. 730,737. PATENTED JUNE 9, 1903.
H. H. BOENKER.
WHEEL PLOW.
APPLICATION FILED FEB. 7, 1903.
NO MODEL. 3 SHEETS—SHEET 1.
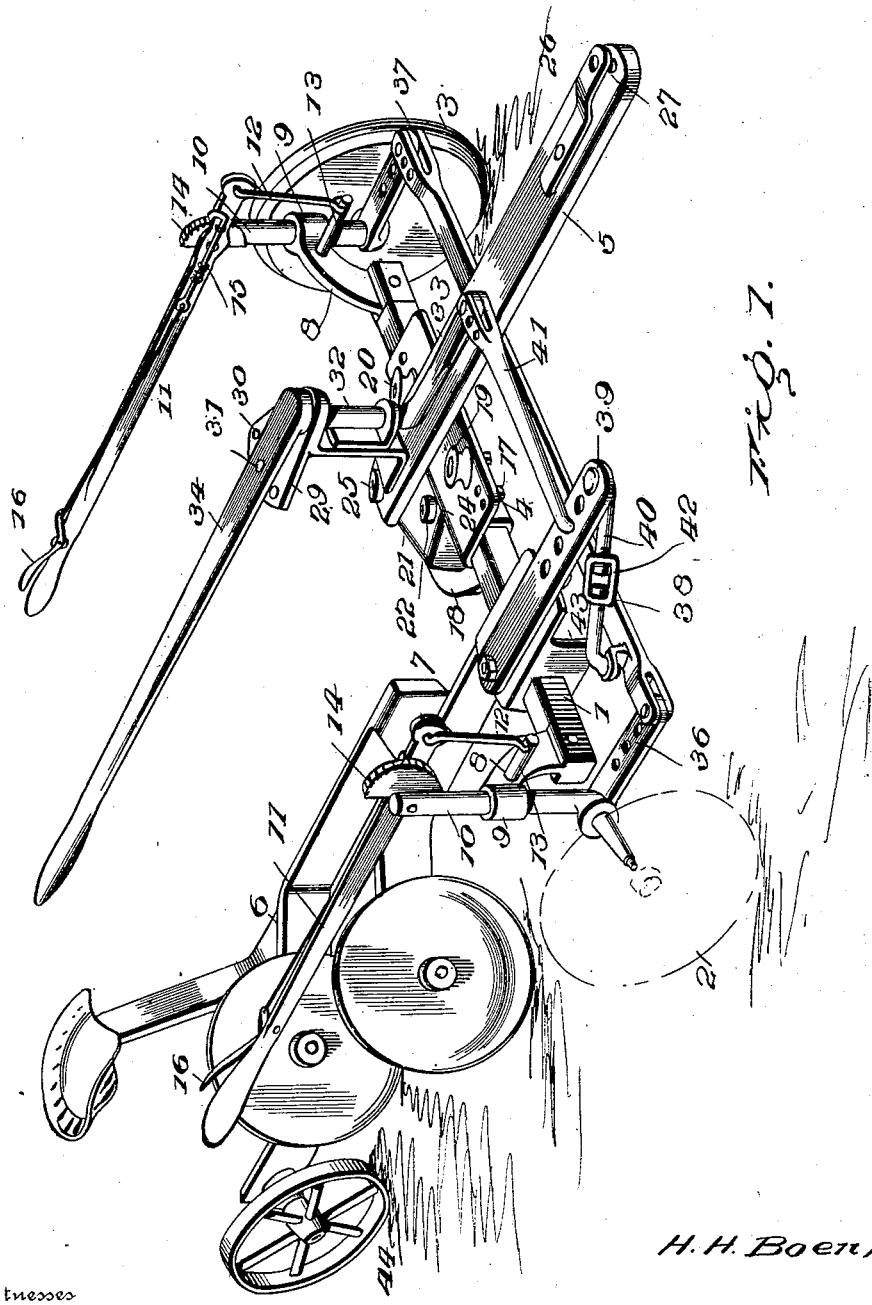
Inventor
H. H. Boenker
Witnesses
By
Attorneys

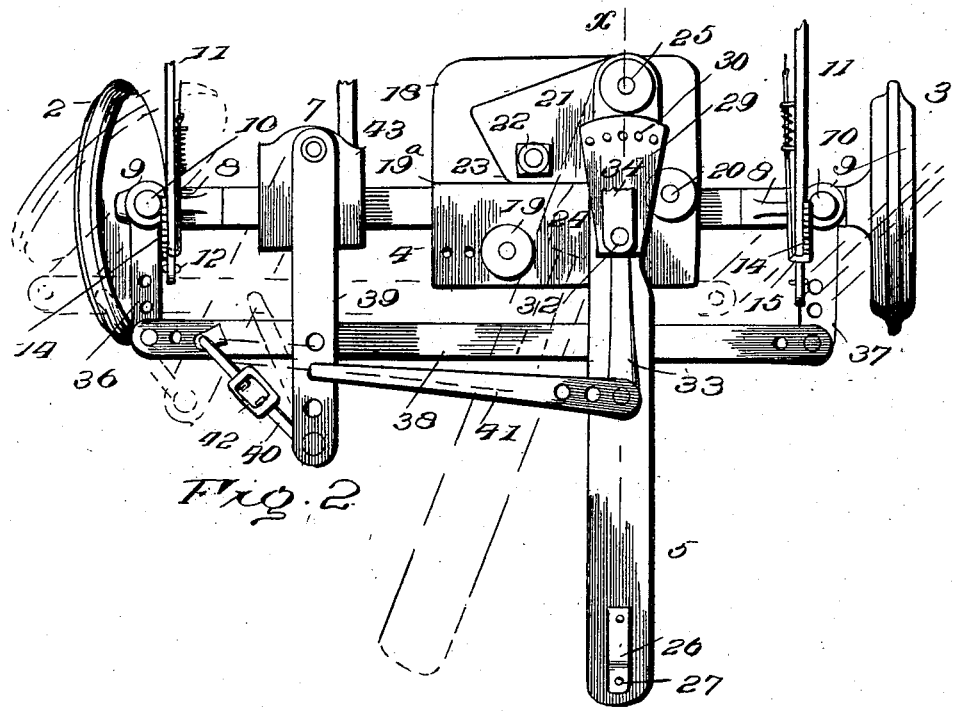
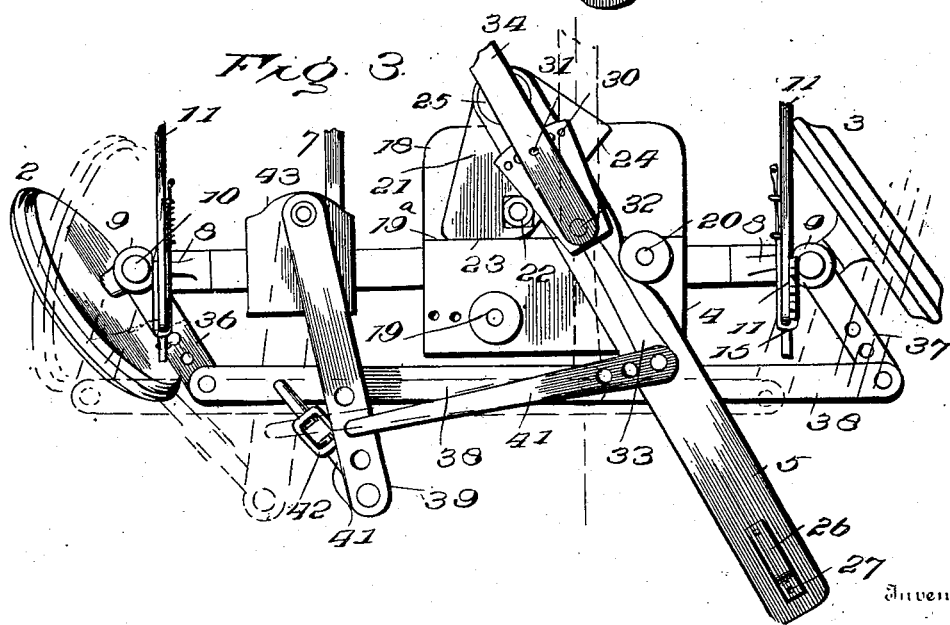

No. 730,737. PATENTED JUNE 9, 1903.
H. H. BOENKER.
WHEEL PLOW.
APPLICATION FILED FEB. 7, 1903.
NO MODEL. 3 SHEETS—SHEET 3.
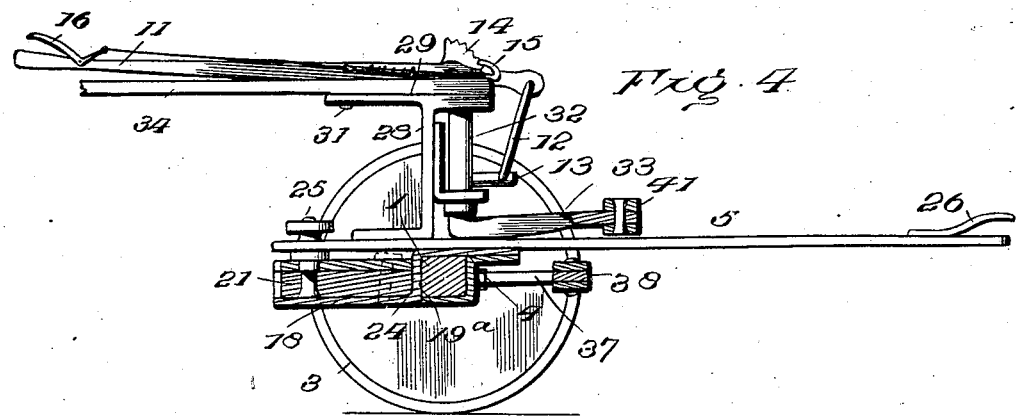
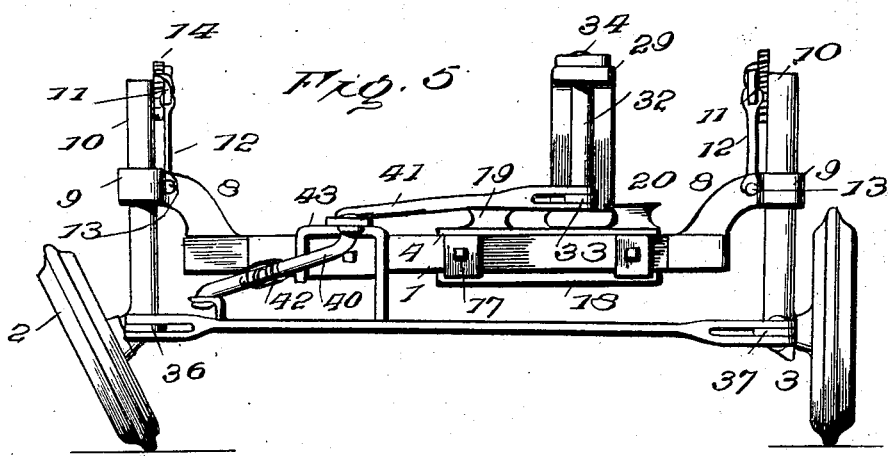
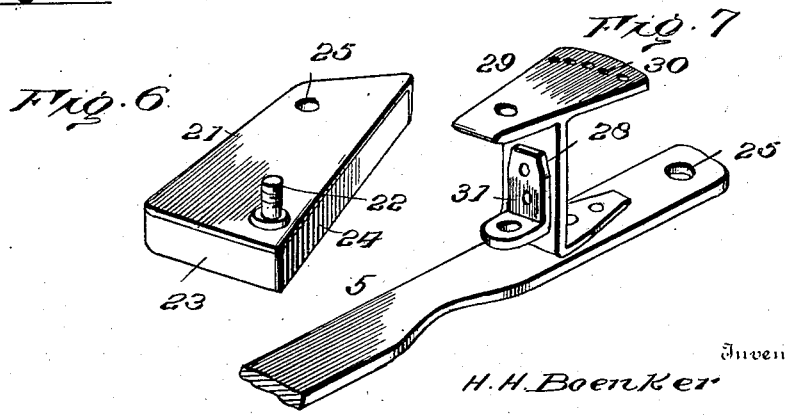
Inventor
H. H. Boenker No. 730,737. Patented June 9, 1903.

UNITED STATES PATENT OFFICE.

HENRY H. BOENKER, OF ST. CHARLES, MISSOURI.

WHEEL-PLOW.

SPECIFICATION forming part of Letters Patent No. 730,737, dated June 9, 1903.

Application filed February 7, 1903. Serial No. 142,383. (No model.)

*To all whom it may concern:*

Be it known that I, HENRY H. BOENKER, a citizen of the United States, residing at St. Charles, in the county of St. Charles and State of Missouri, have invented certain new and useful Improvements in Wheel-Plows, of which the following is a specification.

This invention appertains to agricultural machines designed most especially for tilling the soil, being applicable to plows and cultivators mounted upon rolling supports.

The invention is directed to the mechanism whereby the implement is adapted to be steered or directed in its travel over the field, the special advantages being to facilitate the turning of the machine at the end of a row preliminary to recrossing the field.

While the invention is shown applied in the accompanying drawings to a plow or cultivator of the disk type, it is to be understood that it may be used in connection with implements having plows or earth-treating devices of any variety.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a wheel-plow or disk cultivator, showing the application of the invention. Fig. 2 is a top plan view, the riding attachment and gang being omitted and the dotted lines showing the relative position of the parts when the tongue is moved to the right. Fig. 3 is a view similar to Fig. 2, showing the position of the parts when the tongue is moved to the left at its front end, the dotted lines showing independent adjustment of the ground-wheels by means of the hand-lever. Fig. 4 is a central longitudinal section about on the line X X of Fig. 2. Fig. 5 is a front view. Fig. 6 is a perspective view of the swing-stop. Fig. 7 is a perspective view of the inner end portion of the tongue and the standard applied thereto.

Corresponding and like parts are referred to in the following description and indicated in all the views of the drawings by the same reference characters.

The implement comprises the axle 1; ground-wheels 2 and 3; frame 4, mounted upon the axle; tongue 5; and adjunctive parts for adjusting the different elements, such as will be described more fully hereinafter.

The riding attachment 6 may be of any variety and is coupled to the axle in any accustomed way. The plow or cultivator gang 7 may be of any type, and as illustrated is of the disk variety and is coupled to the axle in the usual way.

Brackets or curved standards 8 are applied to the ends of the axle 1 and terminate at their upper ends in vertical bearings or sleeves 9, in which are mounted the stems 10 of the frames carrying the respective ground-wheels. The stems are adapted to turn and move vertically in the bearings 9 to allow for proper steering and regulation of the depth of plowing or cultivation. Operating-levers 11 are fulcrumed to the upper ends of the stems 10 and are connected by links 12 to lugs 13, projected laterally from the standards 8 in a forward direction, thereby admitting of the levers extending within convenient reach of the driver's seat. Toothed segments 14 are provided at the upper ends of the stems 10, and spring-actuated latch-bolts 15, applied to the levers 11, coöperate with the teeth of the segments 14, so as to hold the levers and the axle in the required adjusted position, the latch-bolts being operable by means of hand-latches 16, pivoted to the rear ends of the levers 11. The links 12 are of such construction and are attached to the respective parts in such manner as to admit of the stems 10 turning freely in either direction, according as the machine is turned either to the right or to the left.

The frame 4 is capable of adjustment along with the axle and is secured in the located position by means of clamp-screws 17. A ledge or shelf 18 projects horizontally from the rear of the frame and is in a lower plane than the top of the axle to form an offset or shoulder 19ª, against which the swing-stop is adapted to engage to limit its movement. Stops 19 and 20 project upward from the frame 4 and limit the lateral movements of the tongue 5, said stops having adjustable connection with the frame to admit of changing the degree of movement of the tongue. The stops 19 and 20 preferably consist of grooved rollers mounted upon pins, so as to reduce the frictional engagement of the tongue when in contact therewith, the groove of the rollers receiving the edge portion of the tongue, so as to prevent upward displacement thereof.

The swing-stop 21 is pivoted to the rear extension 18 of the frame 4 by means of the pin or fastening 22 and consists of a block having the adjacent edges 23 and 24 arranged at an obtuse angle and adapted to engage with the shoulder or offset 19$^a$, so as to limit the turning of the swing-stop in each direction. The tongue 5 is pivoted at its rear end to the swing-stop at 25 and is provided at its front end with a hammer-strap 26 and a series of openings 27 for adjustable connection therewith of the draft. The tongue passes over the frame 4 and rests thereon and is adapted to move between the stops 19 and 20. A standard 28 rises vertically from the rear portion of the tongue 5 and is provided at its upper end with a plate 29, having a series of openings 30. A bracket-lug 31 is secured to the standard 28 and, together with the plate 29, forms a bearing for a vertical shaft 32, having at its lower end a forwardly-extended arm 33 and at its upper end a rearwardly-extended lever 34, said lever having a pin or stud 35 for engagement with any one of the series of openings 30 to hold the lever 34 in an adjusted position. The parts 33 and 34 may be integral with or rigidly applied to the shaft 32.

The frames supporting the ground-wheels 2 and 3 are provided with forwardly-extended arms 36 and 37, having a series of openings in their length for adjustable connection therewith of a transverse bar 38. This arrangement admits of simultaneous movement of the ground-wheels in the same direction. A pivoted bar 39 is adjustably connected to the bar 38 and arm 33 by means of links or connections 40 and 41. The link or connection 40 is composed of sections connected by means of a turnbuckle 42 to admit of lengthening and shortening, so as to adjust the bar 38 and ground-wheels with reference to the pivoted bar 39. The bar 39 is pivoted to a casting or like support 43, mounted upon the axle 1 and secured thereto in an adjusted position by means of a clamp-screw or like fastening. The links or connections 40 and 41 admit of vertical adjustment of the axle 1 when shifting the same to regulate the depth of plowing or cultivation.

When the draft is straight ahead upon the tongue 5, the latter occupies a position about at an angle to the axle, as shown most clearly by the full lines in Fig. 2, said tongue bearing laterally against the stop 20 and the edge 24 of the swing-stop 21 being in contact with the shoulder or offset 19$^a$. When the draft is to turn the machine to the left, the swing-stop 21 moves upon its pivot-fastening 22 until the edge 23 comes in contact with the shoulder 19$^a$, as indicated most clearly in Fig. 3. When the draft is applied so as to move the front end of the tongue to the right, as indicated by the dotted lines in Fig. 2, the tongue turns its pivot connection 25 with the swing-stop and bears against the top 19. In the several movements of the tongue the ground-wheels correspondingly move, as indicated in the different views, to correspond with the position of the tongue, thereby facilitating steering and turning of the machine. The hand-lever 34 provides for independent steering or directing of the implement, as indicated by the dotted lines in Fig. 3. The draft may be straight ahead, whereas the shifting of the hand-lever 34 either to the right or to the left causes the machine to swerve from a direct course to steer clear of an obstacle or to follow the irregularities of a row of plants when cultivating or to properly direct the implement for any purpose. The ground-wheel 2 and the ground-wheel 44 of the riding attachment are inclined away from the furrow side of the machine in the usual may to compensate and resist lateral stress.

Having thus described the invention, what is claimed as new is—

1. In an agricultural machine, and in combination with the ground-wheels connected for simultaneous swinging movement, a pivoted tongue, means connecting said tongue with the connection of the ground-wheels to cause the latter to move in harmony with the tongue when swung either to the right or to the left, and independent means mounted upon the tongue to admit of adjustment of the ground-wheels at any relative position of the tongue, substantially as set forth.

2. In an agricultural machine, and in combination with the ground-wheels mounted for independent movement about a vertical axis, arms projecting laterally from the stems of the frames carrying the ground-wheels, a connecting-bar adjustably secured to the respective arms, a pivoted tongue, a hand-lever mounted upon said tongue, and connections between said hand-lever and connecting-bar to admit of adjustment of the ground-wheels by means of the said tongue or independently thereof by the said hand-lever, substantially as specified.

3. In an agricultural machine, the combination of ground-wheels mounted for angular adjustment, a pivoted tongue, a hand-lever mounted upon the tongue, means securing the hand-lever to the tongue in an adjusted position, a bar connecting the frame of the ground-wheels to effect simultaneous adjustment, an adjustable connection between the said connecting-bar and the hand-lever, substantially as set forth.

4. In an agricultural machine, the combination with ground-wheels mounted for angular adjustment, a hand-lever, a bar connecting the frames of the ground-wheels for simultaneous movement, a pivoted bar, an adjustable connection between said pivoted bar and the connecting-bar, and means connecting the pivoted bar with the hand-lever, substantially as set forth.

5. In an agricultural machine, the combination of ground-wheels mounted for angular adjustment, a bar adjustably connecting the frames of the ground-wheels to admit of independent adjustment thereof, a pivoted bar, an adjustable connection between the pivoted bar and said connecting-bar, and a hand-lever connected with said pivoted bar for adjustment thereof, substantially as set forth.

6. In combination with an agricultural machine of the character described, ground-wheels mounted for angular adjustment, a connecting-bar joining the frames of the ground-wheels, a pivoted tongue, a pivoted bar, a hand-lever mounted upon the pivoted tongue, and means connecting the hand-lever with said pivoted bar and the latter with the connecting-bar, substantially as set forth.

7. In an agricultural machine of the character described, the combination of ground-wheels mounted for angular adjustment, a connecting-bar joining the frames thereof, a pivoted tongue, a standard applied to said tongue, a hand-lever pivoted to said standard, means for securing the hand-lever to the standard in an adjusted position, and means connecting said hand-lever with the aforementioned connecting-bar, substantially as set forth.

8. In an agricultural machine of the character described, the combination of connected ground-wheels mounted for angular adjustment, a frame, a swing-stop pivoted to the frame and having a limited movement, a tongue pivoted to said swing-stop and connected with the ground-wheels to effect adjustment thereof, and stops applied to said frame for limiting the lateral movements of the pivoted tongue, substantially as specified.

9. In an agricultural machine of the character described, the combination of connected ground-wheels mounted for angular adjustment, a frame, a swing-stop pivoted to the frame and having a limited movement, a tongue pivoted to said swing-stop and connected with the ground-wheels to effect adjustment thereof, and stops adjustably connected to said frame and comprising grooved rollers to receive the edge portions of the tongue, substantially as specified.

10. In an agricultural machine of the character described, the combination of connected ground-wheels mounted for angular adjustment, a frame having a rear extension, and an offset forming a shoulder between the frame and extension, a swing-stop pivoted to said rear extension and having adjacent edge portions arranged relatively at an obtuse angle and adapted to engage with said shoulder for limiting the swinging movement of the frame in each direction, a tongue pivoted to the swing-stop and connected with the ground-wheels to effect simultaneous movement thereof, and stops applied to the frame for limiting the lateral movements of the said tongue, substantially as set forth.

11. In an agricultural machine, the combination with the axle bearing the operating parts, frames journaled vertically to the ends of the axle and provided with ground-wheels, hand-levers fulcrumed to the stems of said frames and connected with the respective ends of the axle to effect independent vertical adjustment of the latter, and means for securing the lever to said stems in an adjusted position, substantially as specified.

12. In an agricultural machine, the combination of an axle having the operating parts connected therewith, ground-wheels having their supporting-frames fitted to the ends of the axle for angular and vertical adjustment, a bar connecting the frames of the ground-wheels to effect simultaneous angular adjustment thereof, a tongue pivotally supported by means of the axle, and means connecting said tongue with the aforementioned connecting-bar to admit of vertical adjustment of the axle and angular adjustment of the ground-wheels with the pivotal movements of the tongue, substantially as and for the purpose set forth.

In testimony whereof I affix my signature in presence of two witnesses.

HENRY H. BOENKER. [L. S.]

Witnesses:
R. C. HAENSSLER,
B. H. DYER.